Dec. 15, 1953  J. C. SIMON  2,662,667
BIN DISPENSER
Filed Dec. 13, 1946  3 Sheets-Sheet 1

INVENTOR.
James C. Simon
BY
Evans & McCoy
ATTORNEYS

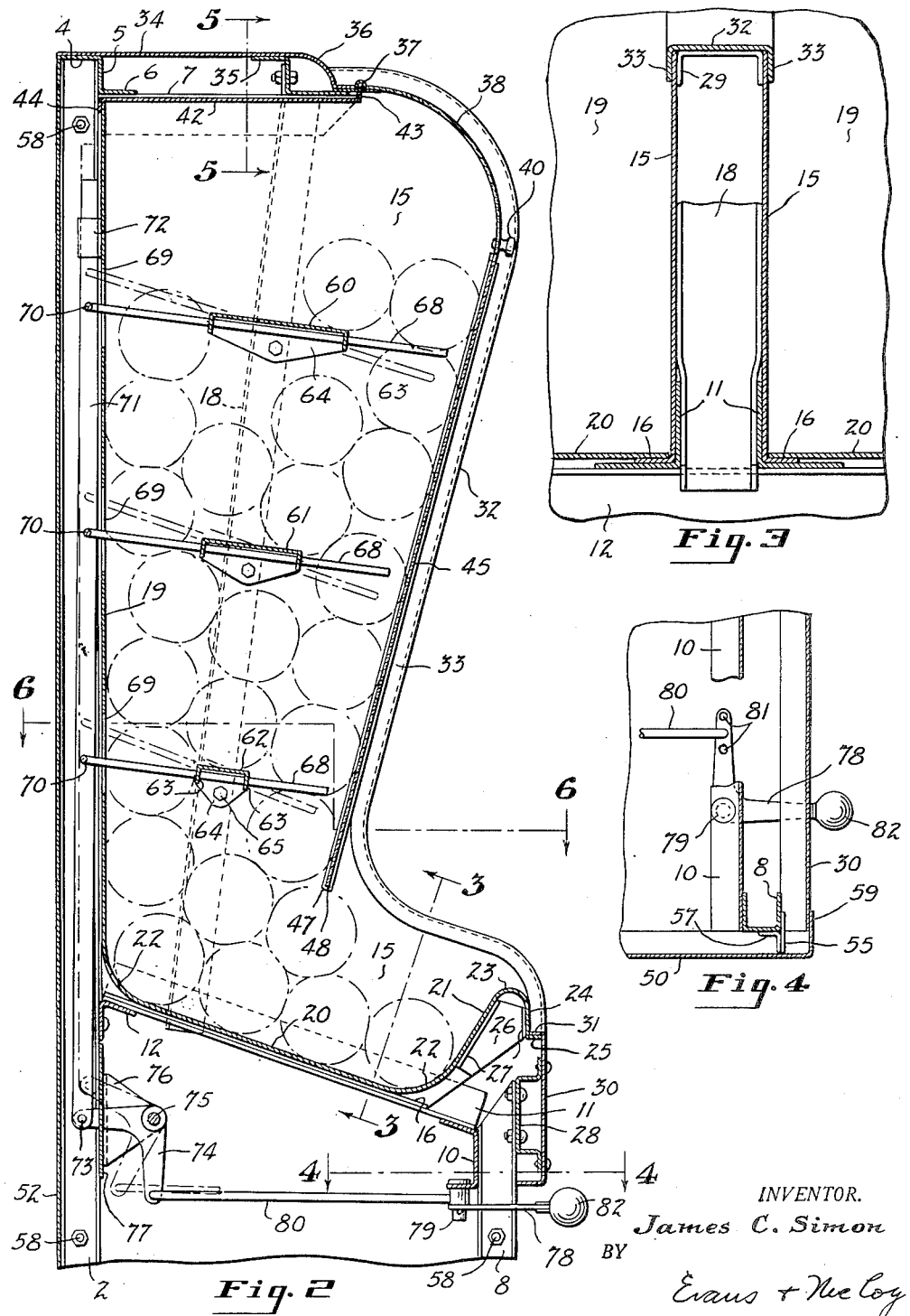

Dec. 15, 1953   J. C. SIMON   2,662,667
BIN DISPENSER
Filed Dec. 13, 1946   3 Sheets-Sheet 3
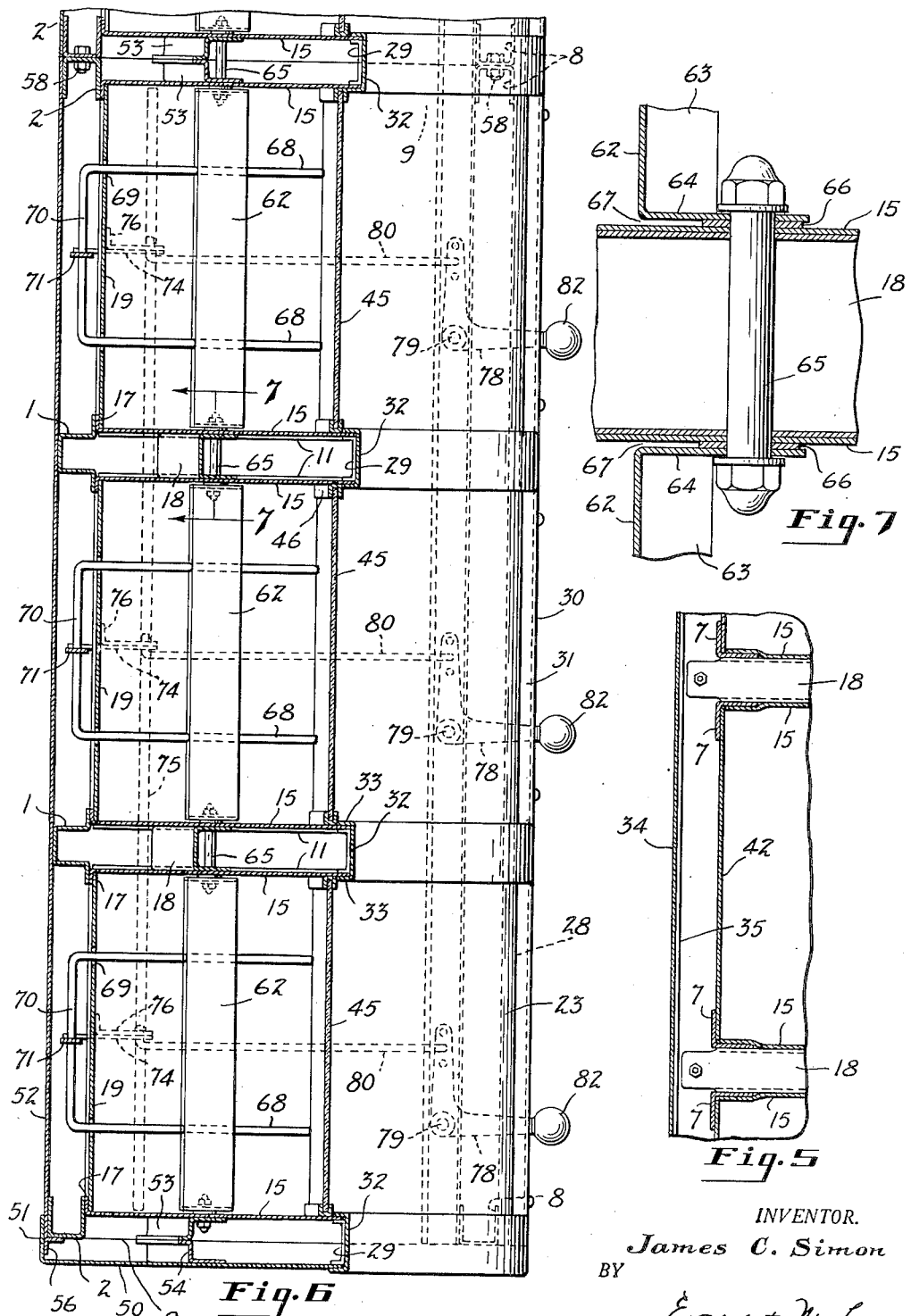
INVENTOR.
James C. Simon
BY
Evans + McCoy
ATTORNEYS Patented Dec. 15, 1953

2,662,667

UNITED STATES PATENT OFFICE 2,662,667

BIN DISPENSER

James C. Simon, Cleveland, Ohio

Application December 13, 1946, Serial No. 716,107

41 Claims. (Cl. 222—247)

1

This invention relates to storage and dispensing equipment and more particularly to bins for storing articles for dispensing purposes of the type in which the articles are movable downwardly through the bin by gravity and are withdrawable from the bottom of the bin as desired.

There are numerous uses for dispensing bins in which bulk articles are stored until desired for use. It is usually preferable to arrange for such articles to be moved or dispensed in a successive manner so that the oldest article in each bin or in storage is first dispensed and succeeding articles are released or dispensed approximately in the order in which they are placed in the bin. Such an arrangement is particularly desirable in the case of bins used for storing and dispensing perishable articles such as fruits and vegetables.

One type of bin that is useful in storing and dispensing bulk articles in a successive manner is the gravity bin having a bottom opening through which the lowermost articles in the bin are withdrawn and a top opening through which articles are introduced to replenish the supply of articles in the bin. As articles are withdrawn through the bottom opening for use, the weight of the articles in the upper portions of the bin causes them to move downwardly by gravity so that there is a progressive movement of articles from top to bottom in the bin.

Gravity bins of the character mentioned have not been entirely accepted for use in connection with certain articles such as citrus fruits and other commodities having surfaces with a high coefficient of friction. Such articles tend to "bridge over" across the lower portions of the bin and the superimposed weight of articles in the upper portions of the bin is not effective in moving the articles downwardly into dispensing position.

Another drawback to conventional gravity bins is the likelihood of crushing or deforming the lowermost articles in the bin by reason of the weight of the superimposed articles, particularly when the articles are stored in the bin over an extended period of time without any being dispensed.

The present invention is therefore directed to the general improvement of gravity type storage bins, particular attention being given to the problems outlined above. The embodiment of the invention used for illustrative purposes in this case is intended for use in fruit and vegetable markets. Dispensing bins for market use are usually installed in multiple. That is to say, a

2 number of such bins can be used advantageously in side by side relation, different fruits and vegetables being thus arranged in an attractive and ornamental display, the various types being individually accessible and in full view for visual comparison with one another and the other commodities.

It is therefore the principal object of the present invention to provide a bulk article dispenser having mechanical means for effecting movement of bulk articles downwardly therethrough as they are dispensed from the bottom. More specifically, the invention aims to provide in a bulk article dispenser agitating means which is effective to reduce the "bridging over" and wedging of articles in the bin so that they are free to move downwardly by gravity.

Another object is to provide a dispensing bin having a number of article supports at different levels therein so that the crushing and deforming of articles at the bottom of the bin is minimized.

Another object is to provide a bin construction which is suitable for use in fruit and vegetable markets, being attractive in appearance, and readily maintained in a clean, sanitary condition. As a particular feature of this invention, it provides a safe, foolproof, market type bulk article dispenser which can be used for self service by the public in selecting purchases without damaging the articles.

A further object of the invention is to provide a multiple bin construction which provides for the assembling of an indefinite number of bins in side by side relation and so as to give the appearance of a unitary, uniform structure.

A still further object of the invention is to provide a dispensing bin device which is relatively simple in design and construction and inexpensive to manufacture. Other objects and advantages of the invention will become apparent from the following detailed description of a suitable embodiment of the invention. This description is made in connection with the accompanying drawings in which:

Fig. 2 is a vertical sectional view through one of the units, with parts broken away and removed, taken substantially on the line 2—2 of Fig. 1 and enlarged with respect to that figure;

Fig. 3 is a sectional detail taken substantially on the line 3—3 of Fig. 2 and enlarged with respect to that figure;

Fig. 4 is a sectional detail view taken substantially on the line 4—4 of Fig. 2;

Fig. 5 is a sectional detail taken substantially on the line 5—5 of Fig. 2;

Fig. 6 is a horizontal sectional view with parts removed and broken away taken substantially on the line 6—6 of Fig. 2; and Fig. 7 is a sectional detail taken substantially on the line 7—7 of Fig. 6 and enlarged with respect to that figure.

Figure 1:
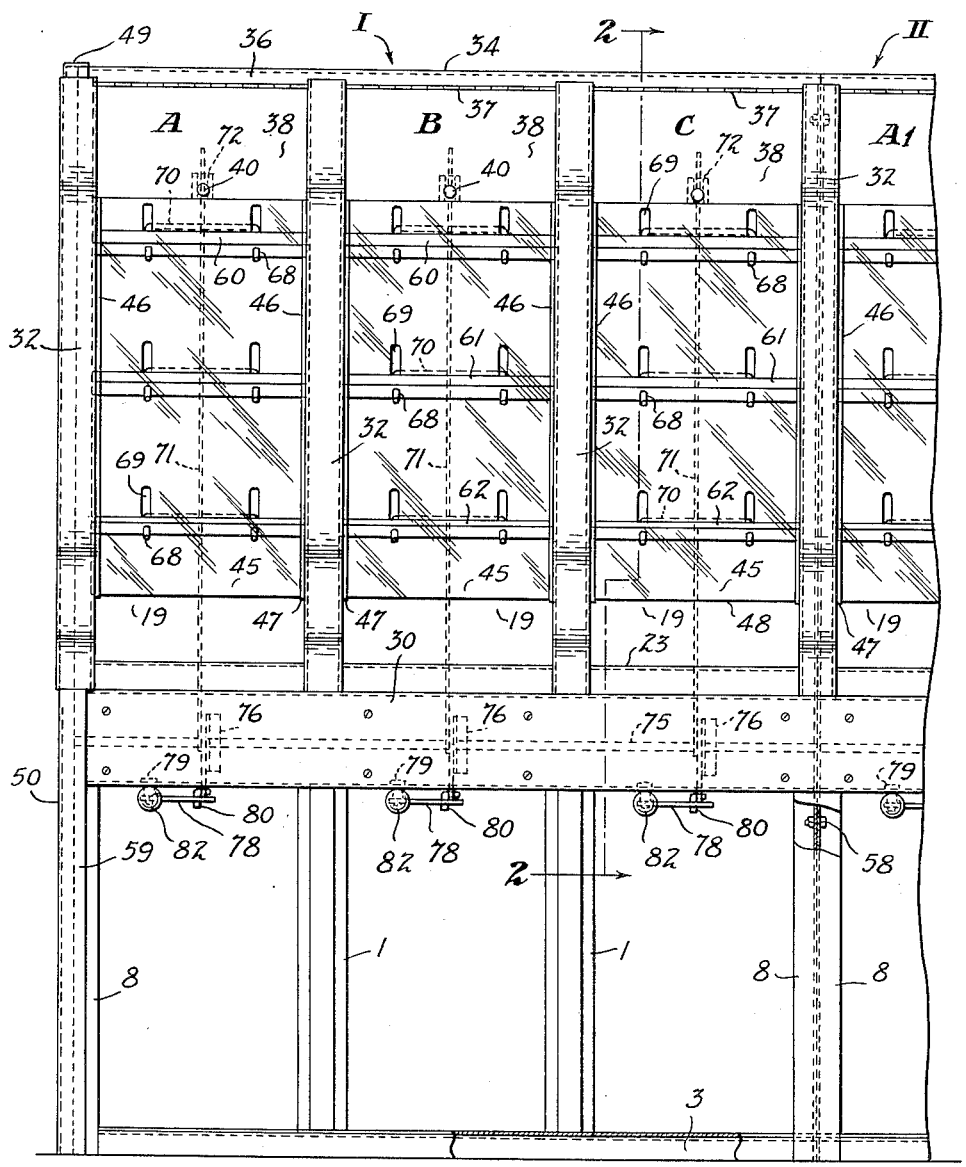
Figure 1 is a front elevational view with parts broken away and removed of an assembly of units of multiple bins.

The multiple bin assembly of the present invention is made up of units each comprising a plurality of bins. For example, the drawings illustrate an arrangement in which unit I, comprising bins A, B, and C, is assembled in end to end relation with unit II, also comprising a plurality of bins $A_1$, $B_1$, and $C_1$. The bins $A_1$, $B_1$, and $C_1$ correspond in construction to the bins A, B, and C, respectively, and for reasons of simplicity bins $B_1$ and $C_1$ are not shown and only a portion of bin $A_1$ is shown. As many of the units may be assembled together in end to end relation as desired to provide the required number of individual storage and dispensing bins.

Each of the units includes a frame structure and panel means carried by the frame structure to define the individual storage and dispensing bins. The parts of the frame structure and of the panel means are designed for fabrication of sheet material such as rolled metal. Other materials may, of course, be employed and elements of the frame can be of wood construction instead of the structural shapes illustrated.

Upright frame members are disposed in spaced relation in the rear of the unit and include intermediate hat-section uprights 1 and end channel uprights 2. The hat-section uprights to which I refer comprise channel members having spaced generally parallel side elements connected by an integral web element attached to one edge of each of the side elements and having integral divergently directed flanges attached to the other edges of the side elements. The lower ends of the uprights are secured to a horizontal base member 3 which may be in the form of an angle section extending the length of the unit. Across the tops of the uprights 1 and 2 and extending the entire length of the unit is a Z-section stringer having a flange 4 resting on the top ends of the uprights and a web 5 disposed flatwise against the uprights. Flange 6 of the Z-section stringer extends forwardly from the uprights and has secured to the underside thereof the rear ends of a number of angle bars 7 which comprise the topside supports for the individual bin panels of the unit. The angle elements 7 are arranged in spaced parallel pairs, one pair at the top of each of the bins A, B, and C and are disposed so that their depending flanges are behind the top marginal edges of the side panels 15 to furnish lateral support for the latter.

At the front of each unit are end uprights 8 which are of channel shape and arranged with the open sides of the channels disposed in confronting relation. These uprights are aligned with the rear end uprights 2, the open sides of the latter also being disposed toward one another. Bottom horizontal end members 9 connect the lower ends of the end channel uprights 2 and 8.

The front end uprights 8 are relatively short and at their upper ends are connected by a front cross framing member 10 (Fig. 2) which is of modified channel section with the web secured to the inside of the uprights. Bottom side bin supports 11 of angle section extend through the depth of the unit in spaced parallel relation to one another, their front ends resting on the obtusely angled upper flange of the framing member 10 and their rear ends resting on the upper flange of an acutely angled rear cross framing member 12 which extends across the inside of the rear uprights 1 and 2. The rear cross framing member 12 is at a higher elevation than the front cross member 10 so that the bottom side supports 11 are inclined upwardly toward the rear of the unit.

The bottom side supports 11 for each of the bins A, B, and C are arranged with their lower flanges directed toward one another and directly below the corresponding pair of topside supports 7 for the same bin. The topside angle bars or supports 7 and the bottomside angle bars or supports 11 of each bin are disposed in spaced parallel relation to the corresponding angle bars or supports of the adjoining bins.

Side wall panels 15 carried by the top and bottom side supports 7 and 11 of each bin are formed of sheet material such as rolled steel, aluminum, laminated plastic, or the like. The panels are disposed flatwise against the vertical flanges of the side supports and are shaped to fit the obtuse angle between the bottom side supports and the rear uprights, the bottom edges of the panels having right angle inturned flanges 16 which rest on the horizontal flanges of the side supports 11 (Fig. 3). The rear edges of the panels 15 have right angle inturned flanges 17 which are disposed flatwise against the edge flanges of the hat-section rear uprights 1 or against the inner flanges of the rear channel uprights 2. The top edges of the panels are disposed flatwise against the depending flanges of the top angle bars 7. Thus the side panels 15 of each bin are supported in upright spaced relation, the adjacent panels of adjoining bins being spaced from one and receiving therebetween upright reinforcing channels 18. The channels 18 extend upwardly between the forward ends of the top angle bars 7 and downwardly between the bottom side supports or angle bars 11. The flanges of the reinforcing channels are secured to the flanges of the side supports.

The structural elements of the frame which may be of rolled metal sections and the sheet metal parts are secured together in accordance with conventional practice. For example, welding and riveting may be used but it is not shown in the drawings in many instances in order to simplify the illustrations.

A one-piece panel element forms rear wall 19, bottom 20, and lower front wall portion 21 of each of the bins. The rear wall panel and the lower front wall panel are integrally connected to the bottom panel 20 by continuous curved portions 22. This one-piece panel is positioned between the side wall panels 15 of the bin, the edges of the one-piece panel being in abutment with the side panels. As shown in Fig. 3, the bottom 20 of each of the one-piece panels rests on the inturned flanges 16 of the side wall panels and is supported by the bottom side angle bars 11. In a similar manner the rear wall panel 19 of the integral one-piece panel element rests against the inturned flanges 17 along the rear edges of the side wall panels and is secured thereto.

Along the top of the lower front wall portion 21 the integral panel element is bent in a continuous curve to provide a rounded crest sill 23 which extends across the front of the bin. A depending apron portion 24 extends as a continuation of the crest 23 and terminates in an outwardly directed angularly disposed flange 25.

The lower outwardly inclined wall portion 21 and the apron 24 of each bin are disposed at an acute angle to one another. A bracket 26 is received in this angle at each end of the sill 23 and is secured against the side wall panels 15. Each of the brackets 26 is formed with flanges 27, which are engaged by and support the side edges of the lower wall panel portion 21 and the depending apron 24.

Across the front of the dispenser is a hat section beam 28 disposed with its web against the upper ends of the outside flanges of the front end uprights 8. A flanged cover plate 30 is supported by the beam 28, being secured to the legs of the latter and having an upper flange 31 which overlies the flange 25 of the apron 24.

The front edges of the spaced side wall panels 15 of adjacent bins are formed with corresponding ogee curves and cooperatively receive cover strips 32 which are continuous from the top of the bins to the flange 31 of the front cover plate 30. The strips 32 have the same ogee curvature as the parallel front edges of the side wall panels 15 and are of channel section with parallel side flanges 33 (Figs. 3 and 6) which embrace and overlie the edges of the side wall panels. Spring metal retainers 29 of U shape are secured in the channel of each of the cover strips 32 to resiliently grip the edges of the side wall panels 15 between the retainer legs and the flanges 33 of the cover strips, thus holding the latter in place.

Across the top of the dispenser a flat sheet metal cover plate 34 is supported on the flange 4 of the rear Z stringer and top flange 35 of a front Z stringer which parallels the rear stringer. The top cover 34 extends across the entire width of the multiple bin unit and is formed with a downwardly curved front apron portion 36 having at its lower edge hinges 37 which carry curved lids or doors 38 at the top of each bin. The doors 38, manually movable by means of knobs 40, correspond in curvature to the top front edges of the side wall panels 15 and are opened for filling the individual bins with articles to be dispensed.

A top panel 42 (Fig. 5) in each of the bins is disposed against and secured to the inturned flanges of the top side supports 7. This panel, of rolled sheet metal, has an upturned flange portion 43 along its front marginal edge which terminates adjacent the hinge 37 for the access door. The rear edge of panel 42 is flanged downwardly at 44 (Fig. 2) and is disposed behind the top edge of the corresponding rear wall panel 19.

The main front wall of each of the bins is preferably in the form of a one piece transparent panel 45. This panel may be a single glass or transparent plastic plate and provides a view of the entire interior of the bin. The edges of the panel are received and retained in channel elements 46 secured to the side wall panels 15. As shown in Fig. 6, the panel retainers 46 are spaced from the forward edges of the side wall panels and are abutted by the edges of the flanges on the cover strips 23. The channel of each of the retainers 46 is closed at its bottom end as indicated at 47 to engage bottom edge 48 of the main front panel and support the latter in spaced relation to the inclined bottom panel 20 of the bin. Thus, there is provided at the bottom of each of the bins an opening along the bottom of the main front wall 45 through which articles that have been moved downwardly through the bin by gravity roll or may pass onto the forward portion of the bottom 20 where they are readily accessible for withdrawal and use. The downward inclination of the bottom wall 20 causes articles received thereon to move or roll forwardly by gravity through the opening at the bottom of the main front wall until they come to rest against the forwardly inclined lower front wall portion 21.

On one or both ends of the assembly of dispensing bin units is an end cover panel 50 which extends from the floor to the top of the unit to which it is attached. Along the rear upright edge of this end panel is an integral angularly disposed flange 51 which overlies the marginal edge of a back panel 52 which extends across the entire rear of the bin unit. The top marginal edge of each of the end cover panels is formed with an inwardly directed flange 49 (Fig. 1) which overlies one of the end edges of the top panel 34. The back panel 52 is secured to the hat section uprights 1 and the rear channel uprights 2 providing, in cooperation with the end panels 50, an imperforate structure extending from the floor to the top of the bin unit assembly. By this arrangement, articles of food stored in the bins are protected from rodents and insects.

At each of the ends of the bin units, Z section stiffeners 53 are disposed in upright positions and extend between and are secured to the bottom side supports 11 and the top side supports 7 in lieu of the reinforcing channels 18 which are used between the centrally located side wall panels. Other Z section stiffeners 54 which match the stiffeners 53 are secured to the central portions of the end panels 50 so that when the end panels are assembled on the ends of the bin units the flanges of the Z section stiffeners 53 and 54 are brought into abutting relation (Fig. 6). The width of each of the stiffeners 53 and 54 is half that of the upright reinforcing channels 18 which are disposed between the side wall panels of adjacent bins. Thus, the end panels 50 and the outer side wall panels 15 of the end bins are positioned by the stiffeners in predetermined spaced relation and separated by distances equal to that which prevails between the side wall panels 15 of the central bin "B" and the bins "A" and "C" adjacent thereto.

One of the continuous cover strips 32 bridges the gap between the forward edge of the side wall panel 15 of each of the endmost bins and the correspondingly curved upper portion of the forward edge of each of the end panels 50. The lower portion of the front edge of each of the end panels 50 is formed with an angularly disposed flange 55 which overlies one of the front end uprights 8. Flanges 59, also formed on the forward edges of the end panels 50, overlie one of the end edges of the front cover plate 30 and are coextensive therewith. Locating members or angles 56 (Fig. 6) and 57 (Fig. 4) are secured to the inside of each of the flanges 51 and 55, respectively, of the end wall panel to abut the upright channels 2 and 8 of the frame structure and thereby retain the end wall in predetermined spaced relationship to the end of the bin unit and parallel to the side wall panel 15 of the end-most bin.

In assembling a number of the bin units of the present invention in end-to-end relation, such as the unit I and unit II, the Z section stiffeners 53 on the confronting ends of the adjacent units are brought into abutment as shown in Fig. 6. The stiffeners 53 being each half the width of the panel spacing reinforcing channels 18 function to position the side wall panels 15 of the endmost bins of adjacent units in predetermined relation and so that the front edges of such panels 15 may be received between the flanges 33 of one of the cover strips 32. As previously mentioned, the end channel uprights 2 and 8 each are disposed or positioned to extend beyond the planes of the endmost side wall panels 15 at the opposite ends of each bin unit a distance corresponding substantially to half the width of the reinforcing or spacing channels 18. Thus, when the bin units are assembled in end-to-end relation, the web portions of the end channel uprights 2 and 8 are brought into abutment (Fig. 6) with the corresponding members of the confronting end of the adjoining bin unit and may be secured together by nuts and bolts 58 until it is desired to disassemble the bin units for removal.

Each of the bin units of the present invention (as the unit I or the unit II) may be used separately as a multiple bin dispenser, its ends being fitted with a pair of matching end covers like the end cover 50 described. If a greater number of bins is desired in one assembly, several of the bin units may be disposed in end-to-end abutting relation, the extreme ends of the assembly being fitted with the end covers 50 and the intermediate abutting ends of the units being secured together by the bolts 58. In each instance and regardless of the number of bins that are thus provided, the dividing walls between adjacent bins and comprising the side wall panels 15 is of the same thickness throughout the structure even though such walls may occur between bins of the same unit, at the abutting ends of adjacent units, or at the extreme ends of the assembly (in which latter case one of the side panels 15 is replaced by a portion of the end cover 50). Furthermore, the end-most walls of the assembly at the end covers 50, as well as the panels between adjacent bins and the end bins of adjacent units, are fitted along their front edges with the cover strips 32 which are identical throughout the structure. By the arrangement described, an attractive, uniform appearance is obtained which is very desirable in providing prefabricated bins for use in fruit and vegetable stores and markets. Furthermore, this arrangement minimizes the number and complexity of parts that must be provided, thereby reducing the cost of the dispensing bins and making assembling, interchanging and rearranging a relatively simple matter.

In utilizing upright bins of the gravity type for dispensing certain bulk articles considerable difficulty is experienced by reason of their tendency to become wedged or stuck in the bin. The articles may tend to "bridge" across the lower part of the bin, being supported entirely by frictional engagement with the walls thereof and failing to move downwardly by gravity even though the bottom 20 is clear and there are no articles on the bottom to obstruct their downward movement. Another opposition to gravity dispensers of the bin type is the tendency of the bottom-most articles in the bin to be crushed or deformed when allowed to remain in the bin for an extended period of time. This crushing is caused by the weight of the superimposed articles and is particularly objectionable in the case of certain fruits and vegetables.

In accordance with the principles of the present invention, means is provided for overcoming or avoiding the "bridging" of articles in the bin and for causing them to move downwardly therein as the bottom-most articles are withdrawn. Intermediate supports are provided within the bin at different levels for carrying the weight of articles so that the bottom-most articles in the bin are not objectionably crushed or deformed. In its preferred form, the apparatus of the present invention combines the intermediate supporting means with the agitating means, although, of course, the two functions may be incorporated in separate elements if desired.

Within each of the bins of the present dispensing units are a plurality of supporting trays and agitators 60, 61 and 62. The number of trays and agitators employed is determined by the height of the particular bins in which they are used and the size of the articles to be dispensed. The taller the bin and the smaller the article, the greater the number of supporting and agitating trays that can be used to advantage. For dispensing citrus fruit such as oranges or grapefruit indicated by the broken lines in Fig. 2 it is sufficient to use trays and agitators at three levels in each of the bins, the bins being each about three feet tall and about one foot deep through the throat. These agitating and supporting trays are disposed at different levels within and extending across substantially the entire width of the bin in which they are mounted. Although the trays may all be of the same size and shape, they are preferably made of different widths, the narrowest tray being disposed at the bottom and the widest at the top, so that a generally uniform spacing or clearance is provided between down turned parallel flanges 63 formed along the side edges of each of the trays and the front and back walls of the bins. The space between each of the downturned tray flanges 63 and the front or back wall confronting the same is made slightly greater than the size of the article to be dispensed from the bin so as to provide adequate clearance for the articles in moving downwardly throughout the bin.

The trays 60, 61 and 62 may be conveniently formed of sheet metal and their ends are provided with downturned flanges 64 (Fig. 7) which are apertured to receive pivot rods or through-bolts 65 extending through holes formed in the bin side panels 15. The upright reinforcing channels 18 and the end stiffeners 53 are so disposed as to lie in the plane of the pivot axes of the agitator support trays and are formed with openings which receive the through-bolts 65 to support the latter. Washers 66 are received on the through-bolts 65 between the flanges 64 of the trays and the side wall panels 15 of the bins to provide clearances 67 which permit the trays to be readily rocked or oscillated.

A number of metal bars are bent or formed to U-shape and constitute agitators disposed transversely across the trays. Leg elements of the bars are parallel and are slidably received in spaced apertures or openings formed in the depending tray flanges 63. Thus the agitator bars are bodily movable relative to the trays carrying the same. The leg portions 68 of the cross elements or bars extend through vertically elongated openings 69 in the rear wall panels 19, back or connecting element 70 of each of the U-shaped agitators being disposed in a space provided between the rear wall panel of the bin and the back wall 52 of the unit. At the rear of each bin and in the space just mentioned is an upright centrally disposed tie bar 71 which is formed with spaced apertures which receive the connecting elements 70 of the U-shaped agitator bars associated with that bin. At its upper end, each of the tie bars 71 is guided for reciprocal movement by a straddle type keeper 72 secured to the back of one of the rear panels 19.

At its lower end, each of the tie bars 71 is pivoted at 73 to one end of a bell crank lever 74 journaled on a horizontal cross shaft 75 mounted in brackets 76 attached to a panel or plate 77 secured to the front flanges of the rear frame uprights 1 and 2. At the front of each of the bins, a manually operable horizontally disposed bell crank lever 78 is pivotally mounted on a vertical pin 79 secured to the bottom flange of the front cross frame member 10. A link bar 80 has angularly disposed ends one of which is received in an aperture formed in the lower end of the depending arm of the rear bell crank lever 74. The other end of the link bar 80 is received in one of a number of holes 81 formed in one arm of the manual lever 78.

When it is desired to move the agitator in any of the bins, the manual lever 78 associated with such bin is operated by grasping and manipulating or oscillating knob 82 on the end thereof. The oscillation or actuation of the manual lever 78 is imparted to the rear lever 74 through the link 80, resulting in vertical reciprocation of the tie bar 71 which moves or operates on the U-shaped bars or cross agitators in unison. This manual actuation of the agitators causes the trays 60, 61, and 62 to be oscillated or moved on the pivot axes of the through-bolts 65, the trays and cross bars or elements 68 moving between the full line position shown to limit positions, one of which is indicated by the broken lines of Fig. 2.

The leg portion 68 of the cross bars extend forwardly to adjacent but not touching the front wall panel 45 of the bin. Each of the agitator assemblies thus comprises one of the trays and the U-shaped bar element associated therewith and represents a grid arrangement, as viewed from above, effective to control the downward movement of articles throughout the horizontal extent of the bin at the level of the agitator.

When there is a clearance below one of the agitator assemblies, oscillatory movement imparted to the agitators causes any articles resting thereon or contacted thereby to be dislodged to move downwardly in the bin by gravity. In this way, articles stored in the bin are induced to move downwardly so that they may be successively withdrawn from or dispensed through the bottom of the bin. When the bins of the unit are full of bulk articles, the articles rest upon and are carried by the relatively broad flat supporting surface of the trays 60, 61, and 62 and in part by the projecting cross bars or elements 68. In this manner, the bottom-most articles in the bin resting on the bottom 20 are not subjected to the aggregate weight of all of the articles carried in the upper portions of the bin and crushing and deformation of the articles is prevented.

If desired and as an alternative arrangement, all of the rear bell crank levers 74 may be secured on the shaft 75 so that when any one of the manual levers 78 is actuated, the oscillating motion is simultaneously imparted to all of the tie bars 71 through the common cross shaft 75. In such case, all but one of the manual levers 78 may be eliminated if desired.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. In a dispenser of the type having a bin through which bulk articles gravitate, a plurality of relatively wide support members disposed one above another in the bin in spaced generally parallel relation, means mounting the support members for to-and-fro pivotal movement, a cross element carried by each support member in transverse relation to the pivotal axis of the member and extending laterally therefrom through one side of the bin, and a reciprocable member outside the bin having connection with the cross elements, said reciprocable member being manually operable to simultaneously oscillate the cross elements and thereby impart to-and-fro movement to the support members.

2. A dispenser comprising panel means defining an upright bin through which articles gravitate, a plurality of agitators and means supporting the same crosswise in the bin at different levels with respect to one another and for oscillating movements about separate axes, an operating element carried by each agitator and extending through the panel means, the several operating elements extending through the panel means at different levels, and means outside the bin having connection with the several operating elements said outside means being operable for simultaneously oscillating the agitators in unison at their respective levels.

3. In a bulk article dispensing device of the type in which articles move by gravity progressively downward through a bin as articles are withdrawn from the bottom of the bin, wall means defining an upright bin having a bottom opening for the withdrawal of articles and a top opening for receiving articles to replenish the supply of articles in the bin as articles are withdrawn, a plurality of relatively wide article supports extending transversely through the bin at different levels to distribute the weight of articles in the bin and thereby prevent crushing of the bottommost articles from the combined weight of all the articles in the upper portions of the bin, there being clearances between the supports and the bin walls to permit articles to move downwardly therethrough by gravity, means mounting the supports for oscillatory movement at their respective levels, and means outside the bin having connection with the supports for oscillating the latter to agitate articles adjacent the supports and cause such articles to move downwardly by gravity through said clearances.

4. In a bin an agitator comprising an article supporting platform member having depending flange means, means for mounting the platform member in the bin for oscillatory tilting movement about an axis offset from the article supporting plane of the member, and an elongated operating element carried by the depending flanges of the platform member and extending generally transverse to the oscillatory axis, the element being longitudinally slidable in the flanges to provide for relative lateral shifting of the platform member during oscillation thereof.

5. In a bin type bulk article dispenser having spaced side wall panels and a rear wall panel extending between the side wall panels, an agitator assembly comprising a sheet metal tray formed with angularly disposed flanges along opposite edges, means mounting the tray within the bin in spaced relation above the bottom of the bin for rocking movement about a generally horizontal axis through the side wall panels, an element extending transversely through the tray flanges and through the rear wall panel, the element having a sliding fit in the flanges for translation of such element relative to the tray during rocking of the latter, and means for rocking the tray.

6. In a bin type bulk article dispenser having spaced side wall panels and a rear wall panel extending between the side wall panels, an agitator assembly comprising a sheet metal tray formed with angularly disposed flanges along opposite edges, means mounting the tray within the bin in spaced relation above the bottom of the bin for rocking movement about a generally horizontal axis through the side wall panels with space between the tray and the rear wall panel for the passage of articles moving downwardly through the bin, an element extending transversely through the tray flanges and through the rear wall panel, the element having a sliding fit in the flanges for translation of such element relative to the tray during rocking of the latter, and means for rocking the tray.

7. In a bin type dispenser having spaced side wall panels and a rear wall panel extending between the side wall panels, an agitator assembly comprising a sheet metal tray formed with angularly disposed flanges along opposite edges, means mounting the tray within the bin and in spaced relation above the bottom of the bin for rocking movement about a generally horizontal axis through the side wall panels, an element extending transversely through the tray flanges and through the rear wall panel, the element having a sliding fit in the flanges for translation of such element relative to the tray during the rocking of the latter, an actuator connected to the transverse element at a point on the latter on the opposite side of the rear wall panel from the tray, and means for operating the actuator to rock the transverse element and the tray about said axis.

8. In a bin type dispenser having spaced side wall panels, a plurality of agitator assemblies between the side wall panels, each assembly comprising a relatively broad thin sectioned tray formed with angularly disposed flanges on opposite edges and an element extending transversely across the tray and through the tray flanges, means mounting each of the agitator assemblies within the bin in spaced relation above the bottom of the bin for rocking movement about an axis through the side wall panels, the transverse elements being disposed to swing reciprocatingly through arcuate paths in planes transverse to the rocking axes during said rocking movement, a common actuator connected to the transverse elements of all the agitator assemblies, and means for operating the actuator to rock the agitator assemblies in unison.

9. In a bin type bulk article dispenser having spaced side wall panels and a rear wall panel extending between the side wall panels, a plurality of agitator assemblies between the side wall panels, each assembly comprising a tray formed with flanges on opposite edges and an element extending transversely across the tray and through the tray flanges, means mounting each of the agitator assemblies within the bin and in spaced relation above the bottom of the bin for rocking movement about an axis through the side wall panels with the tray of the assembly in spaced relation to the rear wall panel to provide a passage for articles moving downwardly through the bin, a common actuator connected to the transverse elements of all the agitator assemblies, and means for operating the actuator to rock the agitator assemblies in unison.

10. In a bin type dispenser having spaced side wall panels, a plurality of agitator assemblies between the side wall panels, each assembly comprising a relatively broad thin sectioned tray formed with angularly disposed flanges on opposite edges and an element extending transversely across the tray and through the tray flanges, means mounting the agitator assemblies for rocking movement about separate, individual, horizontal, vertically spaced axes, the transverse elements being disposed to swing reciprocatingly through arcuate paths in planes transverse to the rocking axes during said rocking movement, an actuator connected to the transverse elements of the agitator assemblies, and means for operating the actuator to rock the agitator assemblies in unison.

11. In a bin type dispenser having spaced side wall panels, a plurality of agitator assemblies between the side wall panels, each assembly comprising a relatively broad thin sectioned tray formed with angularly disposed flanges on opposite edges and an element extending transversely across the tray and through the tray flanges, means mounting the agitator assemblies for rocking movement about substantially parallel separate, individual, horizontal, vertically spaced axes, the transverse elements being disposed to swing reciprocatingly through arcuate paths in planes transverse to the rocking axes during said rocking movement, an actuator connected to the transverse elements of the agitator assemblies, and means for operating the actuator to rock the agitator assemblies in unison.

12. In a bin type dispenser having spaced side wall panels, a plurality of agitator assemblies between the side wall panels, each assembly comprising a relatively broad thin sectioned tray formed with angularly disposed flanges on opposite edges and an element extending transversely across the tray and through and beyond the tray flanges, means mounting the agitator assemblies for rocking movement about separate, individual, horizontal, vertically spaced axes, the transverse elements being disposed to swing reciprocatingly through arcuate paths in planes transverse to the rocking axes during said rocking movement, and means for rocking the agitator assemblies in unison.

13. In a bin type dispenser having spaced side wall panels, a plurality of agitator assemblies between the side wall panels, each assembly comprising a relatively broad thin sectioned tray having spaced edges and an element carried by and extending transversely across the tray and beyond the edges of the latter, means mounting each of the agitator assemblies within the bin and in spaced relation above the bottom of the bin for rocking movement about an axis through the side wall panels, the transverse elements being disposed to swing reciprocatingly through arcuate paths in planes transverse to the rocking axes during said rocking movement, an actuator connected to the transverse elements of the agitator assemblies, and means for operating the actuator to rock the agitator assemblies in unison.

14. In a bin type dispenser having spaced side wall panels, a plurality of agitator assemblies between the side wall panels, each assembly comprising a relatively broad thin sectioned tray having spaced edges and an element carried by and extending transversely across the tray and beyond the edges of the latter, means mounting the agitator assemblies within the bin and in spaced relation above the bottom of the bin for rocking movement about separate individual horizontal, vertically spaced generally parallel axes, the transverse elements being disposed to swing reciprocatingly through arcuate paths in planes transverse to the rocking axes during said rocking movement, and means for rocking the agitator assemblies in unison.

15. In a bin type dispenser having spaced side wall panels and a rear wall panel connecting the side wall panels, a plurality of agitator assemblies between the side wall panels, each assembly comprising a generally horizontally disposed relatively broad thin sectioned tray and an element carried by and disposed transversely across the tray, the transverse elements of the agitator assemblies having portions projecting through the rear wall panel, means mounting each of the agitator assemblies within the bin in spaced relation above the bottom of the bin for rocking movement about an axis through the side wall panels, the transverse elements being disposed to swing reciprocatingly through arcuate paths in planes transverse to the rocking axes during said rocking movement, an actuator disposed on the opposite side of the rear wall panel from the rocking axes of the agitator assemblies, means connecting the actuator to the projecting portions of the transverse elements, and means for operating the actuator to rock the agitator assemblies in unison.

16. In a bulk article dispenser having spaced side wall panels defining an upright bin, a plurality of agitator assemblies between the side wall panels, each assembly comprising a tray for supporting articles received from above and having spaced edges over which articles are released to descend through the bin by gravity and an element carried by and extending transversely across the tray and beyond the edges of the tray, means mounting the agitator assemblies within the bin in vertically spaced relation to one another and above the bottom of the bin for rocking movements about vertically spaced generally parallel axes, and means common to all the agitator assemblies and having individual connection with each such assembly for imparting simultaneous rocking movements to the agitator assemblies to tilt the trays back and forth in unison.

17. In a bin type dispenser having spaced side panels formed with aligned apertures and a rear panel extending between the side panels and formed with an aperture, pivot means extending through the apertures in the side panels, an agitator platform member carried by said pivot means for rocking movement about a substantially horizontal axis and disposed within the bin in spaced relation above the bottom of the bin, said platform member being relatively broad and of relatively thin section and constituting a tray for supporting articles in the bin, a transverse member on the platform member and projecting through the aperture in the rear panel, the transverse member being disposed to oscillate through an arcuate path in a plane transverse to the rocking axis during said rocking movement, and an actuator having connection with the projecting portion of the transverse member for imparting oscillating movements to the transverse and agitator members.

18. In a bin type dispenser having spaced side panels formed with aligned apertures and a rear panel extending between the side panels and formed with an aperture, pivot means extending through and journaled in the apertures in the side panels for rocking movement about a substantially horizontal axis, an agitator platform member carried by said pivot means and disposed within the bin in spaced relation above the bottom of the bin, a transverse member on the platform member and projecting through the aperture in the rear panel, and an actuator having connection with the projecting portion of the transverse member for imparting oscillating movements to the transverse and agitator members, the aperture in the rear panel being vertically elongated and having substantially parallel sides confining and guiding the transverse member for relative vertical movements during said oscillating movements, and the last named aperture having vertically spaced closed ends engageable with the transverse member for limiting the extent of said movements.

19. In a bulk article dispensing device of the type in which articles move progressively downward through a bin as articles are withdrawn from the bin bottom, a plurality of walls defining an upright bin having an open bottom through which articles are discharged, the bin having a top opening for receiving articles to replenish the supply of articles in the bin as articles are withdrawn, tray means located beneath the bin and disposed to receive articles discharged from the bin through the open bottom of the latter, an agitator assembly having a generally horizontally disposed platform portion extending across the bin substantially from one bin wall to another bin wall, said platform portion providing support for articles in the bin above the level of the agitator assembly, means mounting the agitator assembly for tilting movement about an axis substantially parallel to the plane of the supporting platform of the assembly, said platform portion having a discharge edge spaced from and generally parallel to the tilt axis, and actuatable means located outside the bin and connected to the agitator assembly for tilting the latter, the bin, the tray means, and the agitator assembly being so arranged that articles supported on the tilted platform portion gravitate to and are released over the discharge edge of the platform portion, the agitator assembly being disposed wholly above the open bottom of the bin and being spaced above the tray means to provide article-receiving space in the bin below the agitator assembly for receiving articles released over said discharge edge.

20. In a bulk article dispensing device of the type in which articles move progressively downward through a bin as articles are withdrawn from the bin bottom, a plurality of walls defining an upright bin having an open bottom through which articles are discharged, the bin having a top opening for receiving articles to replenish the supply of articles in the bin as articles are withdrawn, tray means located beneath the bin and disposed to receive articles discharged from the bin through the open bottom of the latter, an agitator assembly having a generally horizontally disposed platform portion extending across the bin substantially from one bin wall to another bin wall, said platform portion providing support for articles in the bin above the level of the agitator assembly, means mounting the agitator assembly for tilting movement about an axis substantially parallel to the plane of the supporting platform of the assembly, said platform portion having a discharge edge spaced from and generally parallel to the tilt axis, the agitator assembly including a member disposed transversely to the platform portion and extending through a wall of the bin, said last-named wall being formed with a vertically elongated opening to receive and guide the transverse member of the agitator assembly, the vertically spaced ends of the elongated opening serving as stops engageable with the transverse member to limit movement thereof and of the agitator assembly, and actuatable means located outside the bin and connected to the agitator assembly for tilting the latter, the bin, the tray means, and the agitator assembly being so arranged that articles supported on the tilted platform portion gravitate to and are released over the discharge edge of the platform portion, the agitator assembly being disposed wholly above the open bottom of the bin and being spaced above the tray means to provide article-receiving space in the bin below the agitator assembly for receiving articles released over said discharge edge.

21. In a dispenser having wall panels defining an upright bin, a plurality of agitator assemblies spaced at different levels in the bin, each agitator comprising a platform portion extending across the bin substantially from one wall to another and providing a support in a generally horizontal plane for articles in the bin above the level of the platform, means mounting each agitator assembly for tilting movement about an axis substantially parallel to the support plane of the platform portion of the assembly, the platform portion of each agitator assembly having a discharge edge spaced from and located generally parallel to the tilt axis of the assembly, whereby articles supported on the platform portion of the agitator assemblies gravitate to and are released over the discharge edges of the platform portions upon tilting of the latter, and means common to and connected to all the agitator assemblies for actuating the latter in unison.

22. In a dispensing device for bulk articles, a plurality of panels defining an upright bin tapered in width and having an open bottom through which articles are discharged, the small cross sectional area of the bin being adjacent said open bottom, tray means beneath the bin and disposed to receive articles discharged from the bin through the open bottom of the latter, a plurality of generally horizontal agitator assemblies of different sizes disposed in vertically spaced relation one above another in the bin and arranged with the smallest at the bottom and graduated in size toward the top of the bin, means mounting the agitator assemblies for rocking movement about separate, generally horizontal axes, and means external to the bin and connected to each of the agitator assemblies for actuating the latter in unison to agitate directly and simultaneously bulk articles at different levels in the bin.

23. In a bin structure having spaced walls, an agitator assembly comprising a sheet metal member formed along opposite edges with angularly disposed apertured flanges, means supporting the sheet metal member for rocking movement about a generally horizontal axis through the walls, a U-shaped member having spaced leg portions received through the apertures of the flanges, said U-shaped member also having a portion integral with and connecting the leg portions, the connecting portion being supported by the leg portions in spaced relation to the sheet metal member and the leg portions being disposed to oscillate in planes transverse to the rocking axis during rocking of the sheet metal member, and means actuable for rocking the sheet metal member about said axis.

24. In a bin structure having spaced walls, an agitator assembly comprising a sheet metal member formed along opposite edges with angularly disposed apertured flanges, means supporting the sheet metal member for rocking movement about a generally horizontal axis through the walls, a U-shaped member having spaced leg portions received through the apertures of the flanges, said U-shaped member also having a portion integral with and connecting the leg portions, the connecting portion being supported by the leg portions in spaced relation to the sheet metal member and the leg portions being disposed to oscillate in planes transverse to the rocking axis during rocking of the sheet metal member, a frame supporting the walls of the bin, an actuator mounted on the frame for reciprocable movement, and a connection between the actuator and the U-shaped member whereby movement of the actuator rocks the sheet metal member.

25. In a bin structure having spaced side walls and a cross wall extending between the side walls, an agitator assembly comprising a sheet metal member formed along opposite edges with angularly disposed apertured flanges, means supporting the sheet metal member for rocking movement about a generally horizontal axis through the side walls, a U-shaped member having spaced leg portions received through the apertures of the flanges, said leg portions also extending through the cross wall of the bin, and vertically elongated slots in the cross wall to receive said leg portions and permit swinging of the latter during rocking of the sheet metal member.

26. In a bin structure having spaced side walls and a cross wall extending between the side walls, an agitator assembly comprising a sheet metal member formed along opposite edges with angularly disposed apertured flanges, means supporting the sheet metal member for rocking movement about a generally horizontal axis through the side walls, a U-shaped member having spaced leg portions received through the apertures of the flanges, said leg portions also extending through the cross wall of the bin, and said U-shaped member including a cross element disposed outside the bin and connecting the leg portions.

27. In a bin structure having spaced side walls and a cross wall extending between the side walls, an agitator assembly comprising a sheet metal member formed along opposite edges with angularly disposed apertured flanges, means supporting the sheet metal member for rocking movement about a generally horizontal axis through the side walls, a U-shaped member having spaced leg portions received through the apertures of the flanges, said leg portions also extending through the cross wall of the bin, said U member including a cross element disposed outside the bin and connecting the leg portions, a frame supporting the walls of the bin, an actuator mounted on the frame for reciprocable movement, and a connection between the actuator and the cross element for rocking the agitator assembly by movement of the actuator.

28. A bin type dispensing structure comprising a pair of spaced substantially flat side panels disposed in confronting relation to one another, a one piece panel member of sheet material extending transversely between the side panels and including a relatively low front wall portion, a relatively high rear wall portion, and a bottom wall portion curved into the planes of and connecting the lower ends of the front and rear wall portions, the side panels being formed along their edges with angularly disposed integral flange means directed toward one another and positioned flatwise in supporting relation against the margins of the wall portions of the sheet panel member, and a supporting structure connected at different elevations to the panels adjacent the intersections of the planes of the panels and the surfaces generated by the wall portions of the one piece member.

29. A bin type dispensing structure comprising a pair of spaced substantially flat side panels disposed in confronting relation to one another, a one piece panel member of sheet material extending transversely between the side panels and including a relatively low front wall portion, a relatively high rear wall portion, and a bottom wall portion curved into the planes of and connecting the lower ends of the front and rear wall portions, the one piece member having its edges abutting the side panels substantially throughout the extent of the front, rear, and bottom wall portions, the side panels being formed along their edges with angularly disposed integral flange means directed toward one another and positioned flatwise in supporting relation against the margins of the wall portions of the sheet panel member, and a supporting structure connected at different elevations to the panels adjacent the intersections of the planes of the panels and the surfaces generated by the wall portions of the one piece member.

30. A bin type dispensing structure comprising a pair of spaced substantially flat side panels disposed in confronting relation to one another, a one piece panel member of sheet material extending transversely between the side panels and including a relatively low front wall portion, a relatively high rear wall portion, and a bottom wall portion connecting the lower ends of the front and rear wall portions, the side panels being formed along their edges with angularly disposed integral flange means positioned flatwise in supporting relation against the margins of the wall portions of the sheet panel member, a supporting structure connected at different elevations to the panels adjacent the intersections of the planes of the panels and the surfaces generated by the wall portions of the one piece member, and U sectioned strips embracing the edges of the side panels remote from the rear wall portion of the one piece panel, said strips providing lateral support for those parts of the side panels remote from the intersections.

31. In a dispenser, a bin structure comprising spaced side panels, integral back, front, and bottom panels of sheet material extending between the side panels, the bottom panel being substantially flat and inclined upwardly from the front panel toward the back panel, the side panels each comprising a one piece substantially flat sheet member extending vertically substantially the full height of the rear panel and along the bottom panel substantially from the front panel to the rear panel, the back and front panels each being connected to the bottom panel by an integral curved panel portion having an article-supporting surface to which the surfaces of the panels connected by such curved panel portion are substantially tangent, and a supporting structure having flange means disposed flatwise against the panels adjacent the lines of intersection between the planes of the side panels and the surfaces generated by the other panels.

32. In a dispenser, a bin structure comprising spaced side panels, integral back, front, and bottom panels of sheet material extending between the side panels, the bottom panel being substantially flat and inclined upwardly from the front panel toward the back panel, the side panels each comprising a one piece substantially flat sheet member extending vertically substantially the full height of the rear panel and along the bottom panel substantially from the front panel to the rear panel, the back and front panels each being connected to the bottom panel by an integral curved panel portion having an article supporting surface curved into the surfaces of the panels connected by such curved panel portion, a front wall supported upright across the space between the side panels in spaced relation to the rear panel, the bottom of the front wall being spaced above the bottom panel to provide clearance for articles moving by gravity down the inclined bottom panel, and support means for the panels and wall.

33. In a dispenser, a bin structure comprising spaced side panels, integral back, front, and bottom panels of sheet material extending between the side panels, the bottom panel being substantially flat and inclined upwardly from the front panel toward the back panel, the side panels each comprising a one-piece substantially flat sheet member extending vertically substantially the full height of the rear panel and along the bottom panel substantially from the front panel to the rear panel, the back and front panels each being connected to the bottom panel by an integral curved panel portion having an article-supporting surface curved into the surfaces of the panels connected by such curved panel portion, a front wall supported upright across the space between the side panels in spaced relation to the rear panel, the bottom of the front wall being spaced above the bottom panel to provide clearance for articles moving by gravity down the inclined bottom panel, a plurality of article-supporting platforms at different vertical levels in the space between the front wall and the rear panel, means mounting the platforms for rocking movement about substantially horizontal axes, means having connection with the platforms and extending through the bin for rocking the platforms, and support means for the panels and wall.

34. In a dispensing device for bulk articles, a supporting structure, a plurality of spaced apart panels on the structure ararnged in a series and forming side walls of a series of side-by-side bins, panel means extending between the side wall panels and forming fronts, backs, and bottoms of the bins, the front panel means being formed to provide an opening at the bottom of each bin and the rear panel means of the several bins being disposed substantially in a common plane, a plurality of platforms in each of the bins, the platforms in each bin being disposed one above another to provide in each bin a vertical series of supports for articles therein, means mounting the platforms for rocking movement about substantially parallel axes, the rocking axis of each platform being substantially horizontal, an upright actuator to the rear of the rear panel means, means extending through the rear panel means individually connecting each platform to the actuator, and means extending forwardly from the actuator and accessible in front of the bins for manually operating the actuator to rock the platforms in unison.

35. In a dispenser of the type having an upright bin for receiving relatively bulky articles at the top and through which the articles descend by gravity, the dispenser being formed to provide an opening at the bottom of the bin through which articles are withdrawn, a plurality of platform agitators, means supporting the agitators, one above another in vertically spaced relation at different levels across the interior of the bin for to and fro oscillating movements, each agitator comprising a relatively wide flat platform capable of providing effective support to articles for which the bin is intended, and means outside the bin and connected to the agitators for oscillating the latter to agitate articles in the bin for said gravitational descent, the agitators having margins spaced from the bin walls in the provision of openings at said different levels through which descending articles may pass from one level to the next, a multiplicity of articles being supported at each level by one of the agitators whereby the weight of articles in the bin is distributed amongst the agitator platforms at different levels to prevent crushing of articles in the lower portions of the bin and whereby the oscillation of the agitators at different levels prevents articles bridging across the bin.

36. In a dispenser of the type having an upright bin for receiving relatively bulky articles at the top and through which the articles descend by gravity, the dispenser being formed to provide an opening at the bottom of the bin through which articles are withdrawn, a plurality of platform agitators, means supporting the agitators one above another at different levels across the interior of the bin for to and fro tilting movements about separate vertically spaced axes, each agitator comprising a relatively wide flat platform capable of providing effective support to articles for which the bin is intended, and means outside the bin and connected to the agitators for oscillating the latter to agitate articles in the bin for said gravitational descent, the agitators having margins spaced from the bin walls in the provision of openings at said different levels through which descending articles may pass from one level to the next, a multiplicity of articles being supported at each level by one of the agitators whereby the weight of articles in the bin is distributed amongst the agitator platforms at different levels to prevent crushing of articles in the lower portions of the bin and whereby the oscillation of the agitators at different levels prevents articles bridging across the bin.

37. In a dispenser of the type having an upright bin for receiving relatively bulky articles at the top and through which the articles descend by gravity, the dispenser being formed to provide an opening at the bottom of the bin through which articles are withdrawn, a relatively wide platform disposed across the interior of the bin at a height spaced vertically above the bottom opening for providing effective support to articles for which the bin is intended, means supporting the platform at said height for two and fro tilting movements to constitute the platform an agitator for articles in the bin to prevent articles bridging across the bin and to incline the platform so as to release articles supported thereon, an elongated actuating element carried by the platform for tilting movement with the platform in a plane transverse to the tilting axis of the platform and guided by the platform for endwise sliding movement along an axis in said plane, and an actuator outside the bin and connected to the actuating element to tilt the latter and thereby impart said tilting movements to the agitator platform.

38. In a dispenser of the type having an upright bin for receiving relatively bulky articles at the top and through which the articles descend by gravity, the dispenser being formed to provide an opening at the bottom of the bin through which articles are withdrawn and having an upright panel comprising one wall of the bin, a relatively wide platform disposed across the interior of the bin at a height spaced vertically above the bottom opening for providing effective support to articles for which the bin is intended, means supporting the platform at said height for to and fro tilting movement about a generally horizontal axis substantially parallel to the upright panel, the platform constituting an agitator for articles in the bin to prevent articles bridging across the bin and the tilting of the platform inclining it so as to release articles supported thereon to gravitate through the bin, an elongated actuating element carried by the platform for tilting movement with the latter in a plane transverse to the tilting axis of the platform, and an actuator mounted on the dispenser outside the bin for reciprocating movement, the actuating element extending through the panel and having connection with the actuator and the latter being arranged upon reciprocation to tilt the actuating element and thereby impart said tilting movement to the platform.

39. In a dispenser of the type having an upright bin for receiving relatively bulky articles at the top and through which the articles descend by gravity, the dispenser being formed to provide an opening at the bottom of the bin through which articles are withdrawn, a relatively wide sheet metal platform disposed across the interior of the bin at a height spaced vertically above the bottom opening for providing effective support to articles for which the bin is intended, means supporting the platform at said height for to and fro tilting movements to constitute the platform an agitator for articles in the bin to prevent articles bridging across the bin and to incline the platform so as to release articles supported thereon, said platform being formed along opposite edges with angularly disposed flanges having aligned apertures, an elongated actuating element extending through the apertures in the flanges and guided therein for endwise sliding movement along an axis in a plane transverse to the tilting axis of the platform, and an actuator outside the bin and connected to the actuating element to tilt the latter and thereby impart said tilting movements to the agitator platform.

40. In a dispenser of the type having an upright bin for receiving relatively bulky articles at the top and through which the articles descend by gravity, the dispenser being formed to provide an opening at the bottom of the bin through which articles are withdrawn, a relatively wide platform disposed across the interior of the bin at a height spaced vertically above the bottom opening for providing effective support to articles for which the bin is intended, means supporting the platform at said height for to and fro tilting movements about a generally horizontal axis, the platform constituting an agitator for articles in the bin to prevent articles bridging across the bin and the tilting of the platform inclining it so as to release articles supported thereon to gravitate through the bin, the tilt axis being spaced vertically from the article supporting surface of the platform so that such surface shifts laterally during tilting of the platform to dislodge supported articles, and means outside the bin having connection with the platform for actuating the latter in effecting said to and fro movements.

41. In a dispenser of the type having an upright bin for receiving relatively bulky articles at the top and through which the articles descend by gravity, the dispenser being formed to provide an opening at the bottom of the bin through which articles are withdrawn, spaced panels forming the sides of the bin, a one-piece bottom panel extending between the side panels across the bottom and up the front of the bin to provide integral bottom and front wall panel portions, said one-piece panel also including an apron portion depending from the top of the front wall portion and integrally connected to the latter by a top portion over which articles are normally withdrawn from the bin, the apron portion being spaced from the front wall portion, and bracket means carried by the side panels and extending into the space between the front panel portion and the apron portion to support the one-piece panel, said bracket means including elements disposed flatwise against the front wall and apron portions of the one-piece panel.

JAMES C. SIMON.

References Cited in the file of this patent

UNITED STATES PATENTS

| Number | Name | Date |
|---|---|---|
| 214,783 | McConaughey | Apr. 29, 1879 |
| 324,531 | Carter | Aug. 18, 1885 |
| 448,132 | Curlin | Mar. 10, 1891 |
| 709,438 | Fillmore | Sept. 16, 1902 |
| 893,623 | Groh | July 21, 1908 |
| 1,147,022 | Hoffman | July 20, 1915 |
| 1,374,451 | Heyman | Apr. 12, 1921 |
| 1,504,543 | Draver | Aug. 12, 1924 |
| 1,676,908 | Levene | July 10, 1928 |
| 1,694,897 | Washburn | Dec. 11, 1928 |
| 1,990,756 | Saaf | Feb. 12, 1935 |
| 2,065,860 | Le Page | Dec. 29, 1936 |
| 2,196,399 | Rubel | Apr. 9, 1940 |
| 2,412,951 | Carmo | Dec. 24, 1946 |